US006456568B1

(12) United States Patent
Geiger

(10) Patent No.: US 6,456,568 B1
(45) Date of Patent: Sep. 24, 2002

(54) GOLFER'S WATCH

(75) Inventor: Hervé Geiger, La Neuveville (CH)

(73) Assignee: Montres Antima S.A. (CH)

( * ) Notice: Subject to any disclaimer, the term of this patent is extended or adjusted under 35 U.S.C. 154(b) by 0 days.

(21) Appl. No.: 09/787,478

(22) PCT Filed: Sep. 8, 1999

(86) PCT No.: PCT/IB99/01520

§ 371 (c)(1),
(2), (4) Date: Mar. 15, 2001

(87) PCT Pub. No.: WO00/16170

PCT Pub. Date: Mar. 23, 2000

(30) Foreign Application Priority Data

Sep. 16, 1998 (EP) ........................................ 98117600

(51) Int. Cl.[7] ........................ G04B 47/00; A63B 57/00; G06F 15/44

(52) U.S. Cl. ........................ 368/10; 116/222; 116/377; 116/5

(58) Field of Search ............... 368/3, 10; 116/222–225; 377/5; 473/205, 405

(56) References Cited

U.S. PATENT DOCUMENTS

| | | | | | |
|---|---|---|---|---|---|
| 4,745,875 | A | * | 5/1988 | Timleck | 116/222 |
| 4,864,592 | A | * | 9/1989 | Lee | 377/5 |
| 5,353,439 | A | * | 10/1994 | Kurtz et al. | 2/160 |
| 5,550,884 | A | * | 8/1996 | Berney | 377/5 |

FOREIGN PATENT DOCUMENTS

| | | |
|---|---|---|
| CH | 348930 | 10/1960 |
| CH | 596793 | 3/1978 |

* cited by examiner

*Primary Examiner*—Vit Miska
(74) *Attorney, Agent, or Firm*—McGlew and Tuttle, P.C.

(57) ABSTRACT

A golfer's watch (1) includes an analog counter (2) for the strokes taken on a hole, and a counter (3) of the total number of strokes of the game.

9 Claims, 2 Drawing Sheets

GOLFER'S WATCH

BACKGROUND

The present invention concerns a watch designed especially for golfers' comfort, according to the preamble of claim 1.

The Swiss Patent No 348930 describes a watch with a two-digit aperture where the number of strokes played in a golf game is numerically displayed.

The numerical display is found to be disadvantageous, because it is not very legible, and can be confused with other data, such as the date.

SUMMARY OF THE INVENTION

The analog means preferably comprises a number of colored dots, e.g. in the immediate vicinity of the hour-circle. The number of colored dots represents the number of strokes already taken by the wearer of the watch while he attempts to lodge his ball in a given hole of the golf course. Such number is a sub-total of the golfer's performance, the total number of strokes since the beginning of the game being the really important number.

In a particular embodiment of the invention, this important total number of strokes is displayed in an aperture, i.e. in a window similar to the known date displays. However, in this preferred embodiment the aperture can display three-digit numbers, which precludes any confusion with a date display. Both the analog means, i.e. the number of colored dots, and the three-digit display are incremented at each golf stroke.

In this embodiment of the invention, the watch comprises a rotatable bezel that allows the golfer to easily evaluate the time elapsed since the start of the game. In a known manner, the start index (e.g. a triangle) of the bezel can be set, at the beginning of the game, on the position of the minutes hand. The bezel can then preferably be marked with quarters of an hour. The start index can also be set on the hours hand, position with the bezel then also graduated in hours.

In a further embodiment of the invention, the watch is equipped with a bracelet or band with a shape allowing it to be worn on the side, or edge, of the wrist or of the forearm; this can be on the side of the ulnas bone or on the side of the radial bone.

In a further feature of the invention, the bracelet or band of the golfer's watch according to the invention is designed to allow the golfer to affix his tee on the band. This is easily done by stitching a small pocket in the band to hold the body of the tee. This embodiment has the advantage of offering the golfer a convenient place to store the tee after each hole departure. Storing the tee also can be a reminder to update the analog means on his watch.

In a particular embodiment of the invention, the band also can accommodate a pitch lifter and/or a greens marker. Pitch lifters are of use when the golfer accidentally damages the fairway with his club. They allow raking the grass neatly back into its normal position. Greens markers are used to mark the position of the ball on the green, to avoid such ball interfering with other putting trajectories.

In a further feature of the invention, the band is very easy to take off and put on again. This embodiment has the advantage of allowing the golfer to wipe his wrist or forearm easily, particularly in the case of heat, without the watch being in the way. An example of such a band is described in CH-596793.

In a particular embodiment of the invention, the analog means and the display of the total number of strokes are incremented, after each stroke, by a single push-piece that the golfer can press. This push-piece can be located at the two-o'clock position on the watch case in the preferred embodiment.

In a particular embodiment of the invention, an additional push-piece can be pressed by the golfer to reset the sub-total to zero, as displayed by the analog means. In the case of a set of colored dots, the number of colored dots then returns to zero, all the dots of the set being reset to the same color as the dial of the watch.

This additional push-piece is typically pressed by the golfer after he succeeds in lodging his ball in a hole. The analog means is then ready to count the strokes of the following hole. This additional push-piece can conveniently be located at the ten-o'clock position.

In a further feature of the invention, the watch includes a zeroing means that resets to zero the total number of strokes as displayed in the aperture. The zeroing means is typically actuated at the end of a golf competition.

In a particular embodiment of the invention, the above zeroing means of:

- a rotating crown, at the three-o'clock position, acting on the units digit of the aperture display;
- a second rotating crown, at the four-o'clock position acting on the hundreds and tens digit of the aperture display.

Given the usual par of an 18-hole golf course, and the qualification range of the golfers wearing the watch according to the invention, the first and second figures can be chosen in an appropriate way. A so-called champion finish can distinguish watches with low upper limits, where the units digit will not exceed zero, thus allowing to count to a maximum of 99 strokes in a golf game. A so-called beginner's finish will accommodate upper limits allowing several hundreds of strokes.

In a special embodiment of the invention, the strokes counters are optionally actuated, not only by the incrementing push-piece, but also by the shock created by the stroke.

The direction of the shock is predictable enough to allow the corresponding mechanism to distinguish an accidental shock on the watch itself from a successful stroke, or even an air-shot that is normally considered as a stroke.

The invention will be better understood in the light of the following detailed description, in which:

DESCRIPTION OF THE PREFERRED EMBODIMENTS

Figure 1:
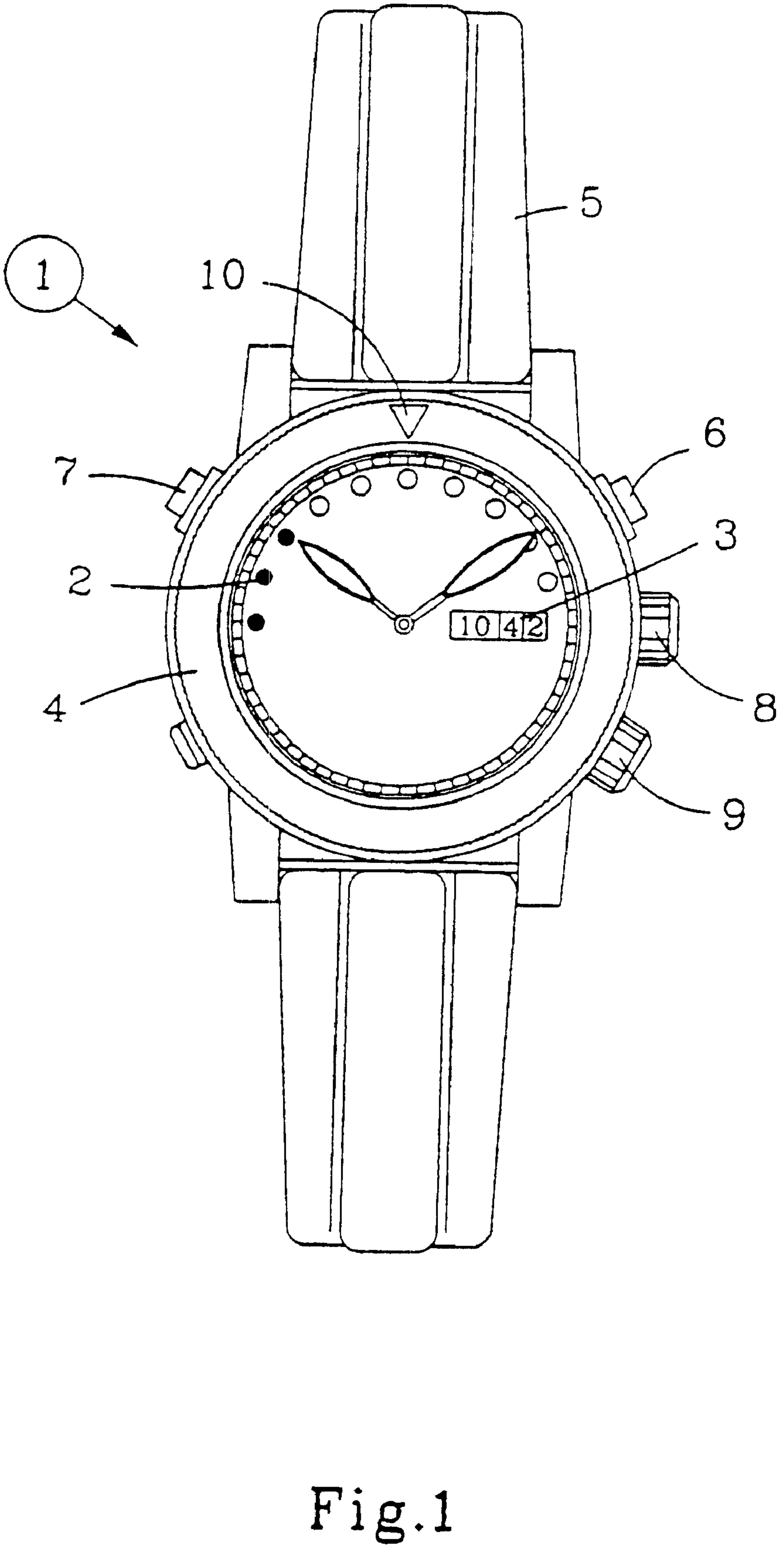
FIG. 1 shows a plan view of a watch according to the invention.

On FIG. 1, a watch 1 is provided with a set of circular dots 2, close to the hour-circle. A push-piece 6, at the two-o'clock position, can be pressed by the wearer to simultaneously:

- change the color of an additional dot 2, from the dial's color to a bright color like red;
- increment the number displayed in an aperture 3.

A bezel 4 can be rotated by the wearer of the watch 1. At the beginning of the golf game, the index 10 of the bezel is placed on the position of the hour hand. The numerals on the bezel then represent the number of hours elapsed during the game.

The watch band 5 can have a form allowing to wear the watch on the side of the wrist, and accommodate a tee, a greens marker and/or a pitch lifter thanks to stitches (not shown).

An additional push-piece 7 serves to reset to zero the display of the colored dots 2.

A crown 8 acts on the units digit of the aperture (4 in the example of FIG. 1).

A second crown 9 acts on the hundreds and tens digits displayed in the aperture (10 in the example of FIG. 1).

In the example shown, the golfer has already taken three strokes on the current hole (three colored dots 2) while the total number of strokes is one hundred and four.

Figure 2:
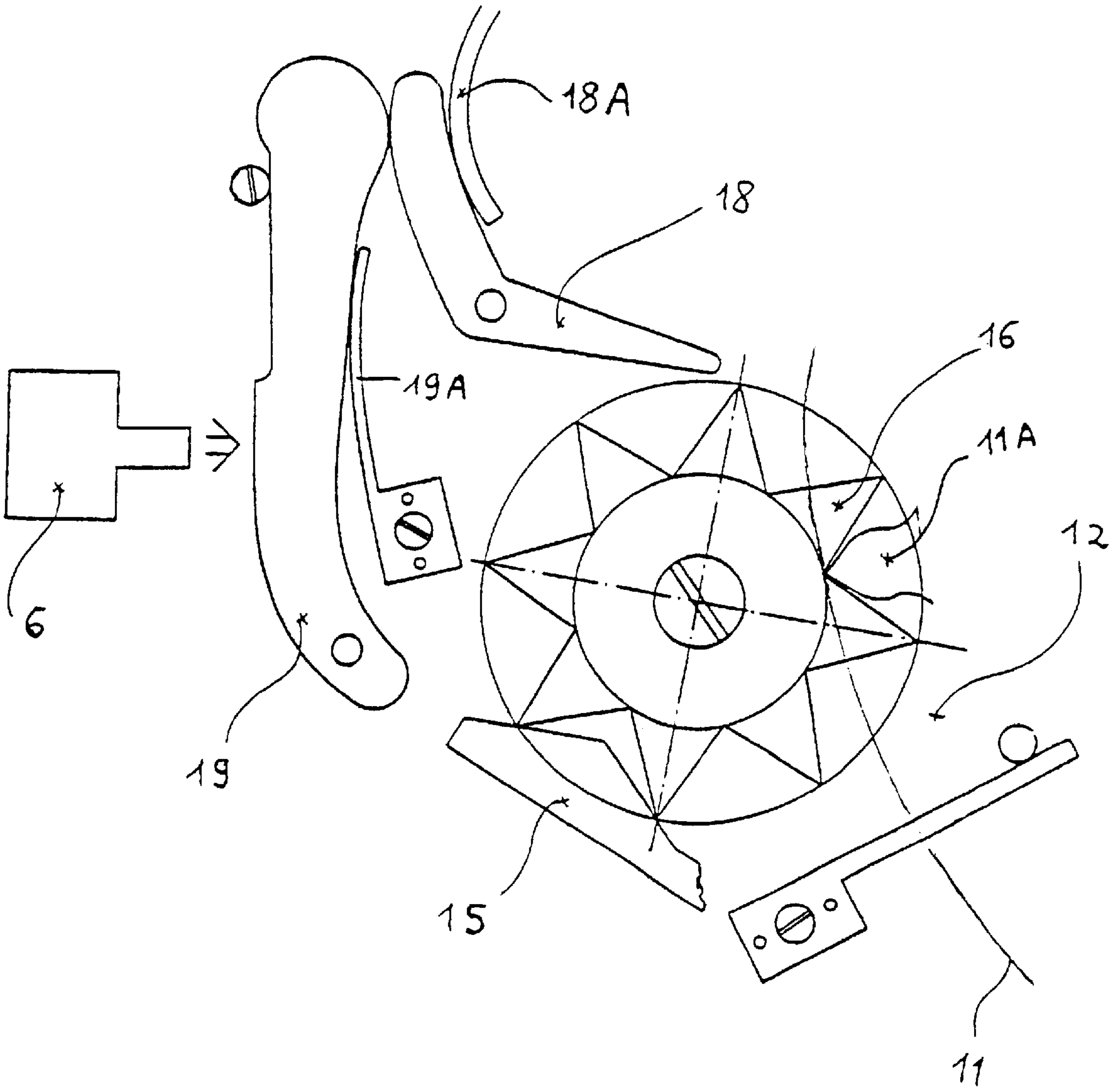
FIG. 2 illustrates an example of a mechanism allowing the analog means 2 to count the strokes.

FIG. 2 schematically illustrates how push-piece 6 acts on a colored gearwheel 12; at the periphery 11 of gearwheel 12, a tooth 11A cooperates with a star 16. A jumper-spring 15 confines star 16 to a limited number of positions.

Pressing button 6 entails rotation of a first lever 19, biased by a spring 19A. Lever 19 actuates an intermediate lever 18, biased by a spring 18A. Intermediate lever 18 engages the leaves of star 16, so as to rotate it incrementally, counterclockwise, thereby rotating clockwise the colored gearwheel 12.

The colored dots 2 are provided by holes in the dial of watch 1; these holes overlie the colored gearwheel 12 and consequently show colors according to the rotated position of such gearwheel.

The protection is, of course, not limited to the described embodiments.

What is claimed is:

1. Golfer's watch including at least one counter of strokes, comprising:

analog means for displaying by means of dots a sub-total number of strokes, representing the strokes taken for a given hole, the number of dots displayed corresponding to the number of strokes.

2. Golfer's watch (1) according to claim 1, characterized by a display of the total number of strokes in an aperture (3), the analog means (2) and the aperture display (3) being simultaneously incremented, at each additional stroke.

3. Golfer's watch (1) according to claim 1, characterized by a rotatable bezel (4) to indicate the elapsed time since the start of the golf game.

4. Golfer's watch (1) according to claim 1, characterized in that the form of the watch band (5) allows the golfer to wear it on the side of his forearm or wrist.

5. Golfer's watch (1) according to claim 1, characterized in that the watch band (5) allows the affixing of a tee, of a pitch lifter or of a greens marker, and is easy to remove from the golfer's wrist.

6. Golfer's watch (1) according to claim 2, characterized by a push-piece (6) at the two o'clock position, allowing the golfer to increment the sub-total and the total numbers of strokes.

7. Golfer's watch (1) according to claim 1, characterized by a push-piece (7) at the ten o'clock position, allowing the golfer to reset to zero the sub-total displayed on the analog means, particularly when a hole is completed.

8. Golfer's watch (1) according to claim 2, characterized by a zeroing means (8, 9), allowing the golfer to reset to zero the total number of strokes in the aperture display, particularly at the end of the golf game.

9. Golfer's watch (1) according to claim 8, characterized in that the zeroing means comprises a first means (8) acting on the units digit in the aperture display and a second means (9) acting on the tens hundreds digits independently of the first means.

* * * * *